March 19, 1946.   I. M. BERNSTEIN   2,396,633
NONADHERENT COATING COMPOSITION
Filed Nov. 23, 1943
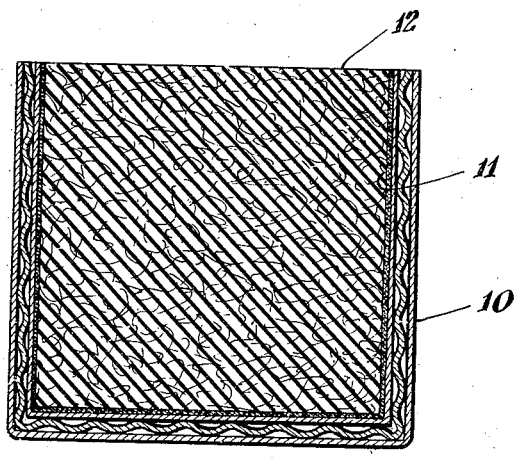
INVENTOR.
Isidor M. Bernstein
BY
ATTORNEY Patented Mar. 19, 1946

2,396,633

UNITED STATES PATENT OFFICE 2,396,633

NONADHERENT COATING COMPOSITION

Isidor M. Bernstein, Brooklyn, N. Y., assignor, by mesne assignments, to H. D. Roosen Company Inc., Brooklyn, N. Y., a corporation of Delaware Application November 23, 1943, Serial No. 511,419

1 Claim. (Cl. 206—46)

This invention relates to a non-adherent coating for containers for synthetic rubbers, such as butyl rubber or buna rubber which have the property of adhering to most container surfaces. When cardboard containers are used these synthetic rubbers adhere to the surface so strongly that the paper frequently tears and particles thereof remain on the rubber as contaminants.

It is an object of the present invention to provide a coating for such containers which is non-adherent to synthetic rubbers of the above type.

Another object is to provide a coating composition having novel and improved characteristics.

Other objects and advantages will be apparent as the nature of the invention is more fully disclosed.

In accordance with this invention I have found that lecithin possesses characteristics which are required for a coating of the above type. A stabilized lecithin-oil composition, when applied to the container surface as a coating, prevents the synthetic rubbers from adhering thereto even after a substantial period of time.

Other phosphatides may also be used but they are not at present commercially available. I prefer lecithin which is extracted from soya seed.

The lecithin is dispersed in oil to form a lecithin-oil composition containing 30% to 40% lecithin. Soya bean oil, linseed oil, cottonseed oil or the like may be used. The composition will depend upon the consistency required. It may be made into a fluid paste of printing ink consistency and applied by printing methods, or it may be made suitable for a spray or other coating means. The paper stock is preferably coated before the container is formed therefrom.

A stabilizer is required in most instances to prevent the lecithin and oil from separating, particularly if the coating is not to be applied immediately. Suitable stabilizers are aluminum hydrate, aluminum silicate, aluminum phosphate, barium sulphate, antimony oxide ($Sb_2O_3$), titanium oxide, zinc sulphide, zinc oxide, aluminum silicates, magnesium silicates, clays, algenates, starches and the like.

In addition, a mechanical separator, such as rice starch, corn starch or other starches or materials forming minute particles may be used to assist in stripping the rubber composition from the coating material.

The stabilizer and separator may be disseminated in the lecithin-oil composition by mixing cold in a mixer, roller mill, colloid mill or other well known means. About 2% to 25% may be used depending upon the stiffness desired.

A pigment may be included to improve the appearance of the coating. Such pigments may comprise organic dyestuffs, inorganic colored pigments or other standard pigment materials, for example, cadmium sulphide, selenium sulphide, lead chromates or the like.

As a specific example, I have used a coating consisting of 79 parts lecithin-oil composition (35% lecithin), 19 parts aluminum hydrate and 2 parts rice starch. The composition was of printing ink consistency and was applied to paper stock by a printing press. When the stock was made into a container it was found that butyl rubber could be shipped and stored therein without adhering to the inner container surfaces and could be easily removed without tearing the paper.

In the drawing the figure is a section through a container embodying this invention.

The container comprises walls 10 made of corrugated paper board, having a lining or coating 11 of lecithin-oil composition, and butyl rubber 12 in the container in contact with the liner 11. The shape of the container is of course only representative.

Although certain specific embodiments have been described, it is to be understood that the invention is capable of various adaptations as will be apparent to a person skilled in the art. The invention is only to be restricted in accordance with the following claim.

What is claimed is:

A butyl rubber package comprising a container having an inside lining comprising a stabilized lecithin-oil composition and butyl rubber in contact with said lining.

ISIDOR M. BERNSTEIN.